US006833788B1

(12) United States Patent
Smith et al.

(10) Patent No.: US 6,833,788 B1
(45) Date of Patent: Dec. 21, 2004

(54) INTRUSION DETECTION RADIO APPLIANCE

(76) Inventors: Steve Smith, 1519 E. Chapman Ave., Suite 305, Fullerton, CA (US) 92831; David M. Kramer, 1519 E. Chapman Ave., Suite 305, Fullerton, CA (US) 92831

(*) Notice: Subject to any disclaimer, the term of this patent is extended or adjusted under 35 U.S.C. 154(b) by 0 days.

(21) Appl. No.: 10/071,808

(22) Filed: Feb. 6, 2002

Related U.S. Application Data

(60) Provisional application No. 60/266,504, filed on Feb. 6, 2001.

(51) Int. Cl.[7] .......................... G08B 21/00; G08B 1/08; H04Q 7/00; H04M 11/04; H04B 1/38

(52) U.S. Cl. ........................ 340/541; 340/431; 340/439; 340/539.11; 340/546; 340/693.11; 379/39; 379/40; 379/41; 379/42; 379/43; 379/44; 455/90; 455/575

(58) Field of Search ................................ 340/431, 439, 340/531, 539–546, 565, 567, 555, 556, 522, 568.2–598.4, 692, 693.9, 693.11, 693.12; 455/90, 575, 404; 379/39–44

(56) References Cited

U.S. PATENT DOCUMENTS 4,059,832 A * 11/1977 Conklin ...................... 340/546
4,176,348 A * 11/1979 Tobin et al. ................ 340/562
4,604,524 A * 8/1986 Kotlicki et al. ............. 250/342
4,742,336 A * 5/1988 Hall et al. .................. 340/539
5,283,549 A * 2/1994 Mehaffey et al. ........... 340/521
5,341,123 A * 8/1994 Schuman et al. ........... 340/546
5,392,026 A * 2/1995 Marik ......................... 340/546
5,463,371 A * 10/1995 Fuller .................... 340/426.27
5,463,595 A * 10/1995 Rodhall et al. ............. 340/522
5,546,071 A * 8/1996 Zdunich ...................... 340/541
5,861,808 A * 1/1999 Lehmann et al. ........... 340/571
6,154,130 A * 11/2000 Mondejar et al. ........... 340/521
6,278,884 B1 * 8/2001 Kim ........................... 455/556
6,441,731 B1 * 8/2002 Hess ...................... 340/539.26
6,765,486 B2 * 7/2004 Roberts ................. 340/539.11

* cited by examiner

*Primary Examiner*—Jeffery Hofsass
*Assistant Examiner*—Lam Pham
(74) *Attorney, Agent, or Firm*—James G O'Neill; Klein, O'Neill & Singh, LLP

(57) ABSTRACT

A remote intrusion detection radio appliance includes a housing having a passive motion detector and related circuitry to monitor and warn of unwanted intrusions, by operating an external radio unit or cellular telephone plugged into the appliance. The appliance, when activated, broadcasts an audio output and then monitors an area in which it is located by audio and/or video for an intruder.

12 Claims, 4 Drawing Sheets

INTRUSION DETECTION RADIO APPLIANCE

CROSS REFERENCE TO RELATED APPLICATION

This application is a continuation of pending provisional application Ser. No. 60/266,504 filed on Feb. 6, 2001.

BACKGROUND OF THE INVENTION

1. Field of the Invention

This invention relates generally to detection systems, and more particularly, to a remote intrusion detection radio appliance device for use by law enforcement and other security personnel.

2. Description of Related Art

Numerous types of security systems are known: examples of such a system are disclosed in U.S. Pat. No. 5,657,076, which uses an unspecified detector to monitor one or more areas, and if triggered, to switch a video signal onto a TV set. A further security system is disclosed in U.S. Pat. No. 5,638,046, which uses a passive infrared motion sensor connected to an RF transmitter which sends encoded data to a remote receiver. The use of encoded data precludes the use of certain radios, such as FRS, and the system is restricted by FCC licensing and/or range limitations.

Another known system is disclosed in U.S. Pat. No. 5,572,201, which uses a transmitter to broadcast emergency information in the FM band, temporarily overriding radio signals received by the public.

A still further alert system is disclosed in U.S. Pat. No. 5,546,072, which uses multiple radio transmitters and multiple unspecified sensors to provide security for a large area. Data is transmitted on an RF carrier, and a direction finding technique is employed to determine which location is affected. This is a far more ambitious and costly system than the system of the present invention and not readily used by law enforcement or security personnel.

Other known systems are shown in U.S. Pat. Nos. 5,534,851, 5,440,292, 5,019,802, 4,949,075, 4,511,887 and 4,121,200.

While the foregoing described prior art provides some improvement in the security system area, there remains the need in the art for an easy-to-use and less costly device for use by law enforcement and other security personnel to detect intruders, at a reasonable price.

SUMMARY OF THE INVENTION

Accordingly, it is a general object of the present invention to provide an improved intrusion detection radio appliance. It is a particular object of the present invention to provide an improved remote intrusion detection radio appliance. It is a still more particular object of the present invention to provide an improved remote intrusion detection radio appliance using one or more passive infrared motion detectors. It is yet a more particular object of the present invention to provide an improved remote intrusion detection radio appliance for use by law enforcement and other security personnel. It is a still further particular object of the present invention to provide an improved remote intrusion detection radio appliance that may be conveniently mounted on a flat surface or secured to a wall or other flat surface. And, it is yet a still further object of the present invention to provide an improved remote intrusion detection radio appliance that provides intrusion monitoring and remote detection, in a low-cost manner, and which can broadcast an audio or video signal through a separate broadcast unit, such as a radio or cell phone, and then monitor an area for the presence of an intruder.

In accordance with one aspect of the present invention, there is provided a remote unit that may be supported on a flat surface and which has a securable backing means for securing to a flat surface. The remote unit has a passive infrared motion detector, which, upon sensing motion, broadcasts a signal over a separate radio unit or cell phone plugged into a socket in the remote unit for reception by law enforcement or other security personnel.

BRIEF DESCRIPTION OF THE DRAWINGS

The objects and features of the present invention, which are believed to be novel, are set forth with particularity in the appended claims. The present invention, both as to organization and manner of operation, together with further objects and advantages, may best be understood by reference to the following description, taken in conjunction with the accompanying drawings, in which:

DESCRIPTION OF THE PREFERRED EMBODIMENTS

Figure 1:
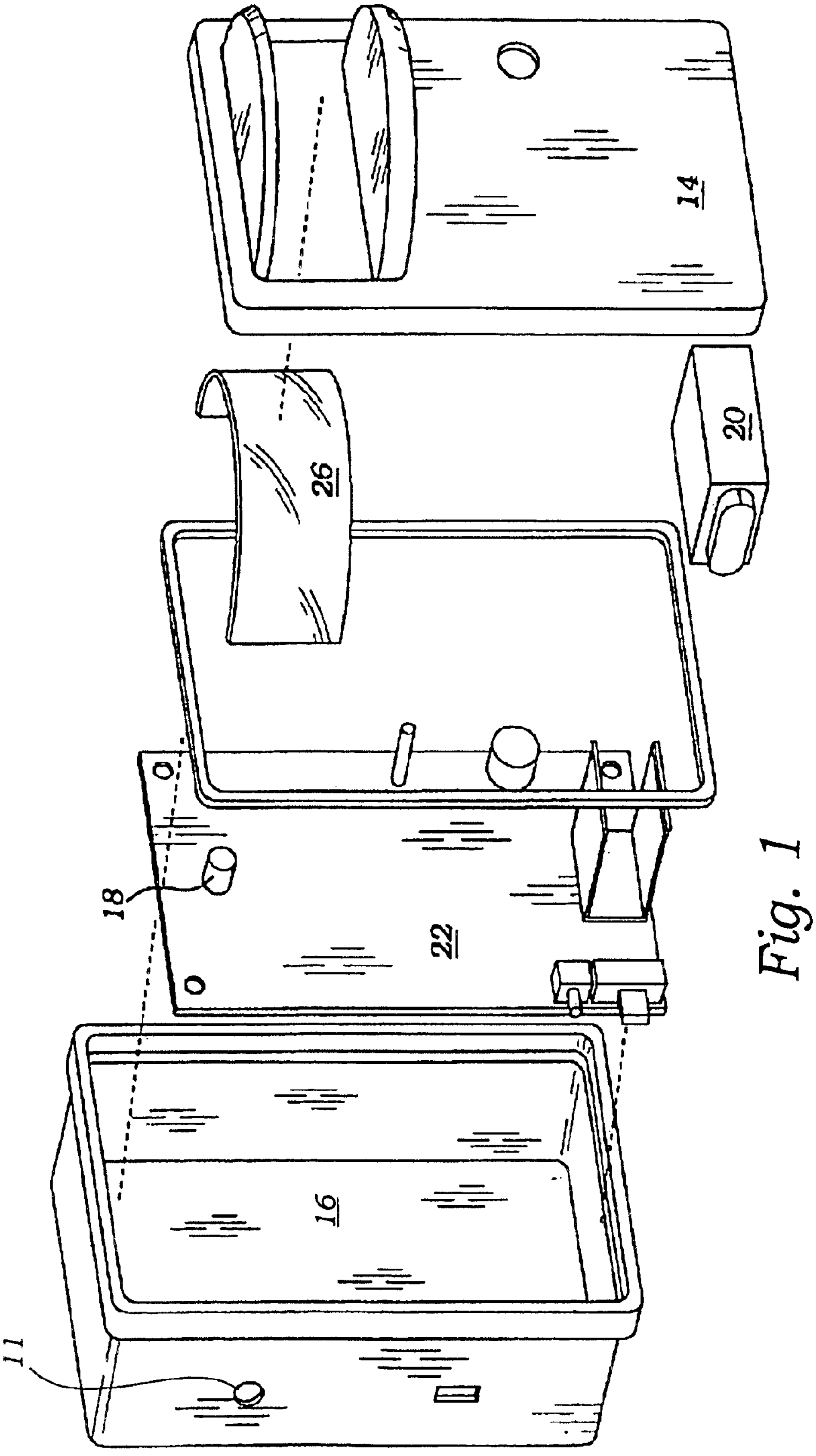
FIG. 1 is an exploded perspective view of a preferred embodiment of the intrusion detection unit of the present invention.
Figure 2:
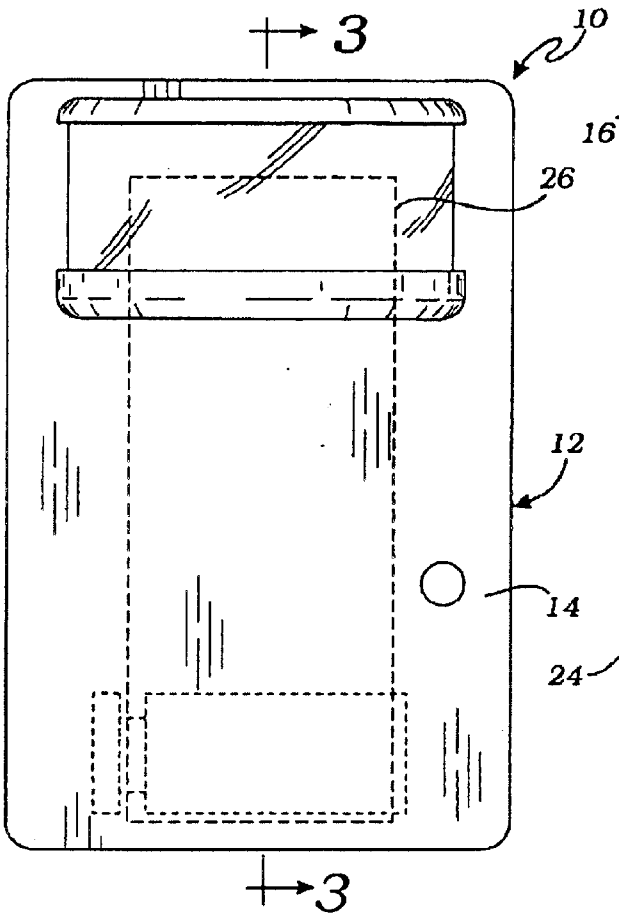
FIG. 2 is a front elevational view of the intrusion detection unit of FIG. 1.

The following description is provided to enable any person skilled in the art to be able to use the invention and sets forth the best modes contemplated by the inventors for carry out their invention. Various modifications, however, will remain readily apparent to those skilled in the art, since the generic principals of the present invention have been defined herein, specifically to provide for an improved intrusion detection unit 10.

The intrusion detection unit 10 of the present invention may use any desired components, with the elements thereof made from any desired material.

As best shown in FIGS. 1–4, the unit 10 of the present invention includes a portable body or housing 12 having all necessary components held therein. The portable body or housing 12 includes a port 11, sides, a base, a front 14, a back 16 and a passive motion detector 18 connected to a power source 20, such as a battery, via a circuit board 22.

Figure 3:
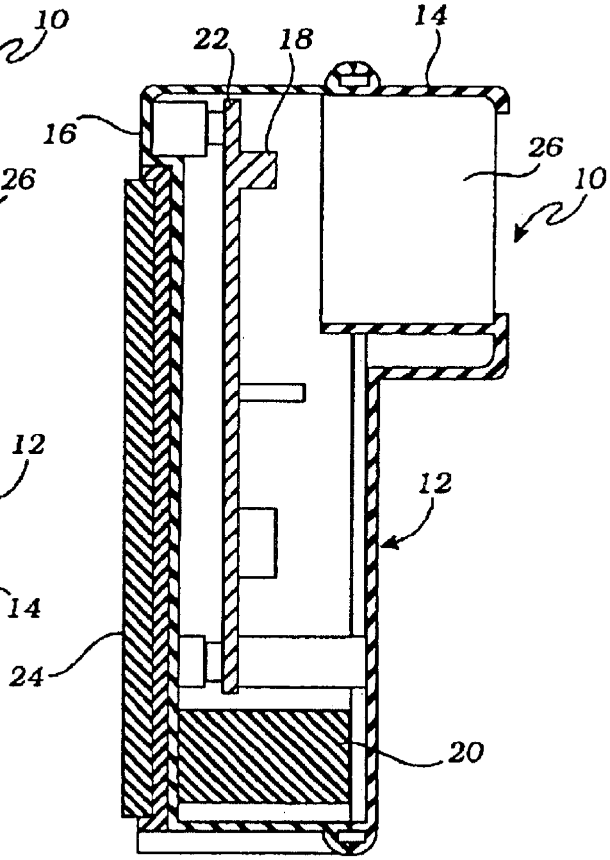
FIG. 3 is a cross-sectional view, taken along line 3—3 of FIG. 2.
Figure 4:
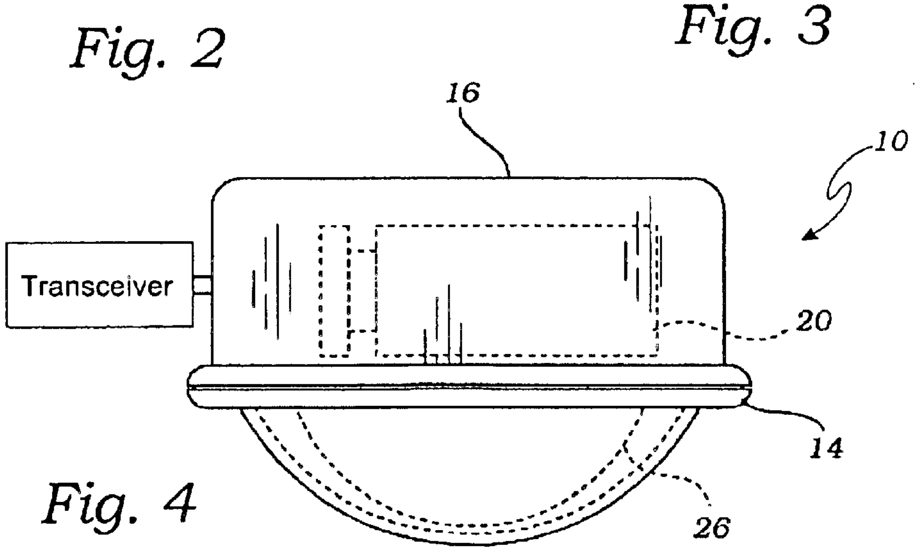
FIG. 4 is a top elevational view of FIG. 2.

As shown in FIG. 3, the rear housing 16 includes a securing means 24, such as a hook and loop fastening means or magnetic holding strip, to allow the unit 10 to be secured in a desired location. For example, the unit 10 can be supported on its base on a flat surface, or secured against a wall, a desk, a filing cabinet, or other flat surface, in an area or room that is to be monitored, such as one that has been checked by law enforcement or other security personnel. The unit 10 would then be turned on and a separate radio unit or cellular telephone plugged into the port 11 in the housing 12 (see FIG. 1), to detect the presence of an intruder after the law enforcement or other security personnel have left the area or room. The unit 10 or the cellular telephone and/or radio unit plugged into the device may include the necessary video or audio adapters and related software, well known to those skilled in the art, to take and transmit images and/or sounds of an intruder. Any camera associated with the unit 10, the separate telephone or the separate radio unit may be of the normal still or video type. This unit 10, therefore, allows more law enforcement or other security personnel to be freed for searching, or other duties, and eliminates the need for them to remain in an area or room that is to be monitored, such as one that has already been inspected or searched, or that is to be continuously monitored. That is, the unit 10 of the present invention will detect the presence of a human intruder, trigger the transmitter of an external radio unit or cell phone plugged into the unit, broadcast a stored audio message in the unit, and then pickup and broadcast still or video images and/or ambient sound from the area or room where the unit is located. To save battery life in the unit and/or the external radio, the unit will include a means to automatically switch power on and off and to switch off power when not in use in or connected to a microcontroller 36 to turn the external radio or cell phone to standby, if no intruder is present.

The passive infrared motion detector 18 preferably uses a dual element pyroelectric sensor, which measures changes in heat within its field of view. A fresnel lens 26, having a wide angle of view, is preferably used to divide the field of view into multiple zones whereby an object, moving from one zone to another, suddenly appears or disappears from the sensor's view. The moving object, therefore, causes a change in signal levels, which is sensed by the accompanying circuitry in the motion detector.

As set forth above, the goal of the unit 10 of the present invention is to be easily portable and to provide area intrusion monitoring and remote detection at low cost for use by law enforcement and other security personnel. This is provided by the unit 10 of the present invention, in which a microcontroller and its' firmware operation and circuitry on the board 22 control the implementation of this intrusion detection radio appliance.

Figure 5:
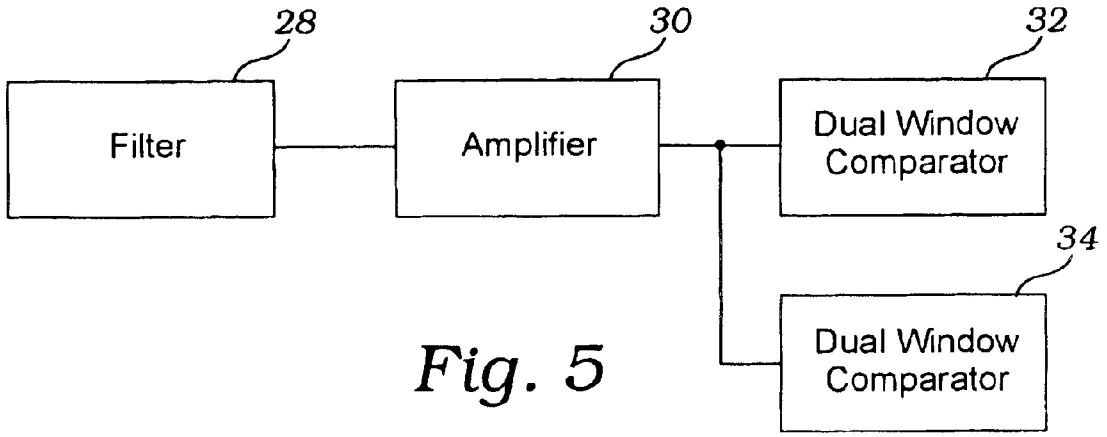
FIGS. 5–7 are schematic representations of the preferred internal circuitry used in the unit of FIG. 1.
Figure 6:
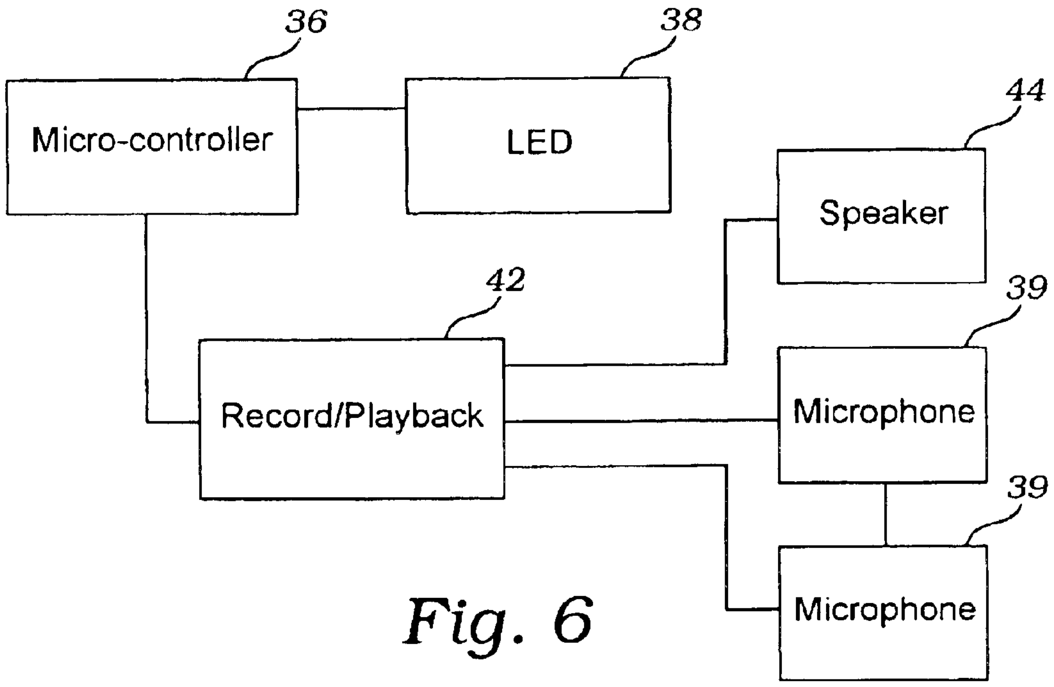
Figure 7:
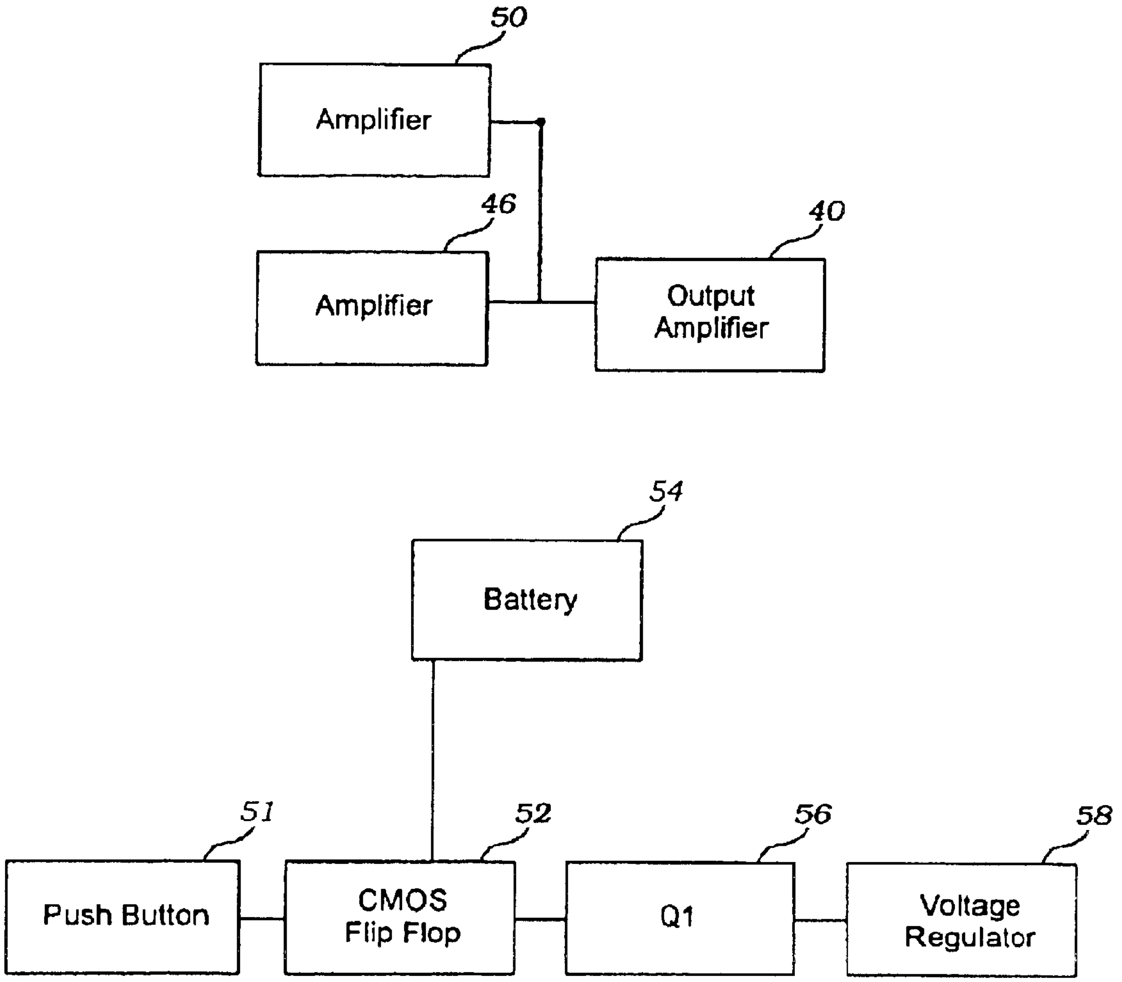

As shown in FIGS. 5–7, the detector 18 is preferably a dual-element pyroelectric passive infrared detector that, like all pyroelectric detectors, is sensitive only to changes in temperature. A change in temperature produces a small voltage, which is amplified by an internal JFET transistor. The detector's dual elements are connected opposing one another. This helps reduce false triggering due to changes in ambient temperature. Any such thermal changes will affect equally both elements and will cancel, producing no output.

The detector 18 is positioned at the focal point of the fresnel lens 26. The lens 26 is designed to have a wide field of view to cover as much of the surrounding area as possible. The lens 26 is also designed with multiple zones, which pass or block infrared energy from an object depending upon position. As a warm object, such as a person moves through the field of view, the zones of the lens 26 breaks repeatedly as the person moves across the field of view. This chopping affect creates a change in infrared temperature of the detector 18, thereby producing an output signal.

A two-stage bandpass filter 28 and amplifier 30 are used and shown in FIG. 5. The amplifier 30 is sensitive to frequencies between 1 and 25 Hz only. This further helps reduce false alarms since normal human motion will fall within this range. The total gain of the amplifier chain is 76 dB. This high gain is needed because the amount of infrared energy striking the detector 18 is very low and thus the signal from the detector is very low as well.

A dual-threshold window comparator is formed by 32 and 34, as shown in FIG. 5. The output of the amplifier 30 is compared with voltage levels set by R8, R9 and R10. If the signal rises above the lower threshold, TRIGA! will switch from a logic high to a logic low. If the signal drops below a lower threshold, TRIGB! will similarly switch. The circuit is designed such that the system will trigger when infrared energy from an object passing from a light to a dark zone, or from dark to light, is sensed.

As shown in FIG. 6, an 8 bit microcontroller or microprocessor 36 with onboard program ROM and RAM is preferably used. The microcontroller 36 operates at a low frequency set by a crystal X1. This low frequency keeps power consumption low for prolonged battery life. Also, as described above, the microcontroller 36 includes a means to prolong battery life in the external radio or cell phone, by turning the external radio or cell phone to standby, if no intruder is present.

An LED 38 is driven by one output port from microcontroller 36. Upon power up, this LED 38 will flash for a predetermined time, such as several tens of seconds. During this time, the amplifier and detector circuit are allowed to stabilize, and triggers are inhibited. This allows an operator to turn the unit 10 on, plug in a separate radio unit or cell phone, if not already done, and leave the area without triggering the system. Once the LED 38 stops flashing, the system is armed and ready to sense movement and broadcast on the external radio or cell phone plugged into the unit 10.

The TRIGA and TRIGB signals from the window comparator 32, 34, previously discussed, are inputs to the microcontroller 36. Either of these inputs becoming a logic low will start the transmit cycle. The cycle begins by microcontroller 36 turning on power to the output circuitry. This signal is called, or indicated as, +5 VSW, and by keeping this off except when triggered, helps extend battery life.

When the XMT! signal is brought low, a load is applied to an external microphone input 39 to the external radio or cell phone, which simulates keying the push to talk switch. The external radio or cell phone will now transmit the stored audio and then ambient audio or video images.

The ALARM output from microcontroller 36 produces a modulated square wave that is coupled into a transmit output amplifier 40 by R26 and C23 (see FIG. 7). Unless somehow shutoff, this causes a beeping tone which precedes the transmission of the stored audio message.

As shown in FIG. 6, the unit 10 includes an analog record/playback device 42 having a flash memory as a non-volatile storage medium. This device 42 may store up to 12 seconds of audio, such as recorded or synthesized tone or voice. When a trigger occurs and the external radio or cell phone has been placed into transmit mode, a PLAY signal is brought low causing a playback of the recorded audio signal. Device 42 is designed to directly drive a speaker 44 so the signal is coupled to an amplifier 46 by R28 and C26. The output of amplifier 46 is then fed to output amplifier 40.

Once the transmission of the previously recorded audio is completed by the device 42, the signal from a microphone 39 is amplified by a further amplifier 50. The output from this amplifier 50 is also coupled into output amplifier 40 so that ambient sounds may be monitored and transmitted for several seconds, or the plugged in cellular telephone and any video camera may transmit images to alert law enforcement or other security personnel of an intruder.

To record on the device 42, a record button is pressed and held. The microcontroller 36 then powers up the microphone circuitry and sends a record command to the record/playback device 42. While recording, the LED 38 turns on. Recording stops when the user releases the button or when a maximum time of approximately 12 seconds has elapsed.

Power to the unit 10 is turned on and off with a momentary pushbutton 51 (see FIG. 7). A CMOS flip-flop 52 is powered whenever a 9-volt battery 54 is connected thereto. The current draw by flip-flop 52 is low enough that the shelf life of the battery 54 is not significantly affected. Each time the power button 51 is pressed, flip flop 52 toggles between the set and reset conditions. In the reset condition, 56 is turned on, thus sending power from the battery 54 to voltage regulator 58, and hence powering up the rest of the circuitry. In the set condition, 56, and all other circuitry, are off.

It, therefore, can be seen that the present invention provides a novel and improved, low cost intrusion detection device into which a separate radio or cellular telephone unit is plugged to allow law enforcement or other security personnel to leave the intrusion detection unit in a given area for monitoring the area, without the need for further personnel.

Those skilled in the art will appreciate that various adaptations and modifications of the just-described, preferred embodiments can be configured without departing from the scope and spirit of the invention. Therefore, it is to be understood that, within the scope of the appended claims, the invention may be practiced other than as specifically described herein.

What is claimed is:

1. A portable intrusion detection appliance, consisting of:

a small, lightweight, low-cost, easily portable body having a back, a base, a front and a plurality of side walls;

an infrared motion sensor held in the small, lightweight, low-cost, easily portable body;

a microprocessor held in the small, lightweight, low-cost, easily portable body and connected to the infrared motion sensor; the microprocessor including means to activate an audio output in response to receipt of a signal signifying that motion has been detected by the infrared motion sensor;

a record/playback device having a microphone coupled to the microprocessor for recording ambient sound held in the relatively small, lightweight, low-cost portable body;

a non-volatile storage medium held in the small, lightweight, low-cost, easily portable body for storing the audio output and the ambient sound;

an input jack in one of the plurality of side walls of the small, lightweight, low-cost portable body for coupling a separate transceiver to the microprocessor, whereby the separate transceiver may be activated by the microprocessor to receive and broadcast the audio output and the ambient sound;

the base allowing the portable intrusion detection appliance to be mounted in an upright position in an area to be monitored; and the back including a securing means for selectively, releasably securing the small, lightweight, low-cost portable body to a further item; and an internal power source held in the small, lightweight, low-cost portable body and coupled to the microprocessor.

2. The portable intrusion detection appliance of claim 1 wherein the securing means is a hook and loop fastener.

3. The portable intrusion detection appliance of claim 1 wherein the securing means is a magnetic holding strip.

4. The portable intrusion detection appliance of claim 1 wherein the front has an opening formed therein and the infrared motion detector extends through the opening.

5. The portable intrusion detection appliance of claim 1 wherein the internal power source is a battery and the microprocessor includes a means to automatically switch power on and off to prolong battery life.

6. A portable intrusion detection appliance consisting of:

a relatively small, lightweight, low-cost, easily portable body having a power source coupled to an infrared motion sensor held therein;

a microprocessor held in the relatively small, lightweight, low-cost, easily portable body and coupled to the power source and to the infrared motion sensor; the microprocessor including means to activate an audio output in response to receipt of a signal signifying that motion has been detected by the infrared motion sensor;

a record/playback device having a microphone held in the relatively small, lightweight, low-cost, easily portable body and coupled to the microprocessor for recording ambient sound;

a non-volatile storage medium held in the relatively small, lightweight, low-cost portable body for storing the audio output and the recorded ambient sound;

an input jack in the relatively small, lightweight, low-cost portable body, whereby a separate transceiver may be plugged into the input jack and activated by the microprocessor to receive and broadcast the audio output and the recorded ambient sound; and the relatively small, lightweight, low-cost portable body including a base and a back having a securing means thereon for selectively supporting the portable intrusion detection radio appliance in an upright position on the base, or secured to a further item by the securing means, in an area to be monitored.

7. The portable intrusion detection appliance of claim 6 wherein the securing means is a hook and loop fastener.

8. The portable intrusion detection appliance of claim 6 wherein the securing means is a magnetic holding strip.

9. The portable intrusion detection appliance of claim 6 wherein the power source is a battery and the microprocessor includes means to automatically switch power on and off to prolong battery life.

10. A portable intrusion detection appliance consisting of:

a low-cost portable body having a base, a front, two sides, a top and a back and an input jack;

a single infrared motion sensor held in the low-cost portable body and extending through an opening formed in the front;

a microprocessor held in the low-cost portable body and connected to the infrared motion sensor and a battery held in the low-cost portable body;

the microprocessor including means to activate a synthesized tone or voice recorded on an analog record/playback device having a microphone for recording ambient sound in response to motion detected by the infrared motion sensor;

a non-volatile storage medium held in the low-cost portable body for storing the synthesized tone or voice and the ambient sound;

the portable intrusion detection appliance including no means to broadcast synthesized tone or voice, whereby a separate transceiver must be plugged into the input jack to enable the separate transceiver to be activated by the microprocessor to receive and broadcast the synthesized tone or voice and ambient sound; and a securing element mounted on the back of the low-cost portable body for supporting the low-cost portable body on a vertical surface.

11. The portable intrusion detection appliance of claim 10 wherein the securing element is a hook and loop fastener.

12. The portable intrusion detection appliance of claim 10 wherein the securing element is a magnetic holding strip.

* * * * *